Patented Aug. 14, 1945

2,382,137

UNITED STATES PATENT OFFICE 2,382,137

STEATITE-TYPE BODY AND METHOD OF PRODUCING SAME

Henry L. Crowley, South Orange, and Arthur M. Hossenlopp, Metuchen, N. J., assignors to Henry L. Crowley & Company, Inc., West Orange, N. J., a corporation of New Jersey No Drawing. Application May 17, 1944, Serial No. 536,020

4 Claims. (Cl. 106—46)

This invention relates to steatite-type ceramic bodies, the mixtures comprising them and the methods of preparing them.

One of the objects of this invention is to provide a new form of fired ceramic body having improved mechanical and electrical characteristics and particularly having Q values in excess of 2000.

A further object of this invention is the provision of a new steatite-type of ceramic body vitrified at relatively low temperatures as, for example, within the range of 1250° C. down to as low as 900° C.

A further object of the invention is to shorten the firing time even at the lower temperatures noted above.

Other objects and advantages of this invention will be apparent from the following description.

This invention resides substantially in the products, steps, and series of steps, all as will be hereinafter set forth in full detail.

Ordinary steatite bodies are fixed on an 8 to 16 hour cycle although such bodies can be satisfactorily fired in from 8 to 9 hours as a preferred firing range. Such bodies are so fired for these time periods at a temperature of from 1250° C. to 1400° C.

It is an object of this invention to provide a ceramic body prepared from a mixture of suitable ingredients which will be capable of being fired to vitrification at a temperature of from 1250° C. down to as low as 900° C. in a period of about one hour, thereby resulting in a considerable economy because of the reduced firing time and heat requirements.

A suitable mixture in accordance with this invention comprises the following ingredients in the proportions by weight listed below:

| | Per cent |
|---|---|
| Ball clay | 10 |
| Whiting (CaCO$_3$—Calcium carbonate) | 6 |
| Barium carbonate (BaCO$_3$) | 24 to 35 |
| Zinc oxide (ZnO) | 1 to 10 |
| Boric acid (H$_3$BO$_3$) | 1 to 10 |
| Talc | 58 to 29 |

Ball clay is a material comprising essentially aluminum oxide (Al$_2$O$_3$) and silicon dioxide (SiO$_2$) in approximately equal proportions. Talc is also a well known material having the chemical composition of magnesium oxide (MgO) 30% by weight and silicon dioxide (SiO$_2$) 60% by weight, with the remainder principally water. This product is low in lime content.

Suitable mixtures of the above ingredients in the proportion ranges disclosed will produce bodies having the approximate chemical proportions by weight:

| | |
|---|---|
| Al$_2$O$_3$ | 4.52 to 4.79 |
| BaO | 21.35 to 33.00 |
| CaO | 3.85 to 4.08 |
| B$_2$O$_3$ | 0.64 to 6.83 |
| MgO | 21.15 to 11.22 |
| SiO$_2$ | 47.40 to 26.00 |
| ZnO | 1.14 to 12.12 |

Mixtures of these various ingredients within the proportion ranges listed above are prepared, to which mixtures are preferably added suitable organic binders and the like well known in the art. These mixtures are then formed into pieces of the desired shape by extrusion, compression and the like and then fired for periods of one hour or less at the preferred temperatures ranging from 1100° C. down to 950° C. until complete vitrification results, although satisfactory results have been obtained at temperatures ranging from 1250° C. to 900° C. As those skilled in the art will understand, the firing times and temperatures will vary with the ingredient proportions to produce the final desired result. Bodies thus prepared have very high Q factors as, for example, in one instance a body thus prepared had a Q factor of 6800 which is very high when compared with Q factors of 1000 to 1500 for high grade steatite bodies now extensively manufactured for commercial purposes.

When desired these bodies may be impregnated with wax or other water proofing compound so as to render them impervious to moisture and thus insure stabilization of their electrical characteristics under various atmospheric conditions. It has also been found that bodies thus prepared have very low electrical losses at very high frequencies thus very well adapting them to many modern electrical uses.

From the above description, it will be apparent to those skilled in the art that the subject matter of this invention is subject to variation within the limits specified and we do not, therefore, desire to be limited except as required by the indicated scope of the invention and the appended claims.

What is claimed is:

1. Insulating bodies having a composition of ingredients in parts by weight comprising:

| | |
|---|---|
| Ball clay | 10 |
| Whiting (CaCO$_3$—Calcium carbonate) | 6 |
| Barium carbonate (BaCO$_3$) | 24 to 35 |
| Zinc oxide (ZnO) | 1 to 10 |
| Boric acid (H$_3$BO$_3$) | 1 to 10 |
| Talc | 58 to 29 |

2. Insulating bodies having a composition of ingredients in parts by weight comprising:

| | |
|---|---|
| Al$_2$O$_3$ | 4.52 to 4.79 |
| BaO | 21.35 to 33.00 |
| CaO | 3.85 to 4.08 |
| B$_2$O$_3$ | 0.64 to 6.83 |
| MgO | 21.15 to 11.22 |
| SiO$_2$ | 47.40 to 28.00 |
| ZnO | 1.14 to 12.12 |

3. A method of preparing a ceramic insulating body comprising firing the mixtures of claim 1 for a period of not more than one hour at a temperature between 1250° C. and 900° C.

4. A method of preparing a ceramic insulating body comprising firing the mixtures of claim 2 for a period of not more than one hour at a temperature between 1250° C. and 900° C.

HENRY L. CROWLEY.
ARTHUR M. HOSSENLOPP.